(12) United States Patent
Hagedorn

(10) Patent No.: US 8,718,549 B2
(45) Date of Patent: May 6, 2014

(54) MOBILE WIRELESS COMMUNICATIONS DEVICE FOR NEAR FIELD COMMUNICATION (NFC)OPERATIONS AND RELATED METHODS

(75) Inventor: J. David Hagedorn, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 160 days.

(21) Appl. No.: 13/241,615

(22) Filed: Sep. 23, 2011

(65) Prior Publication Data

US 2013/0079026 A1 Mar. 28, 2013

(51) Int. Cl.
*H04B 5/00* (2006.01)
*H04B 7/00* (2006.01)
*H04W 24/00* (2009.01)

(52) U.S. Cl.
USPC ..... 455/41.1; 455/41.2; 455/41.3; 455/456.1; 455/456.2

(58) Field of Classification Search
CPC .......... H04B 5/00; H04B 7/24; H04B 5/0031; H04B 7/00; H04W 4/008; H04W 4/02; H04W 24/00
USPC ........ 455/41.1, 41.2, 41.3, 414.1, 418, 456.1, 455/456.2, 517; 370/252, 395.4, 508
See application file for complete search history.

(56) References Cited

U.S. PATENT DOCUMENTS

| | | | |
|---|---|---|---|
| 8,140,010 B2 * | 3/2012 | Symons et al. | 455/41.1 |
| 2006/0148404 A1 * | 7/2006 | Wakim | 455/41.2 |
| 2008/0224825 A1 * | 9/2008 | Nystrom et al. | 340/10.1 |
| 2010/0178866 A1 * | 7/2010 | Jalkanen | 455/41.1 |
| 2010/0231383 A1 | 9/2010 | Levine et al. | 340/540 |
| 2012/0244883 A1 * | 9/2012 | Tibbitts et al. | 455/456.2 |
| 2012/0322371 A1 * | 12/2012 | Lee | 455/41.1 |

FOREIGN PATENT DOCUMENTS

EP 2190175 5/2010
WO 2008103001 8/2008

OTHER PUBLICATIONS

Chang et al. "*Accelerometer-assisted power efficient Wi-Fi networking on public transportation system*" http://www.citeulike.org Printed Oct. 28, 2010 Abstract only.
"*Optimizing your USB Mouse polling-rate*" http://www.nextlevelgamer.com/tweaks/optimizing-your-usb-mouse-polling-rate Printed Sep. 22, 2011.
U.S. Appl. No. 12/856,788, filed Aug. 16, 2010, Griffin et al.

* cited by examiner

*Primary Examiner* — Inder Mehra
(74) *Attorney, Agent, or Firm* — Allen, Dyer, Doppelt, Milbrath & Gilchrist, P.A.

(57) ABSTRACT

A mobile wireless communications device may include a satellite position determining device, and a near-field communication (NFC) device being switchable between a first NFC mode and a second NFC mode, wherein the second NFC mode provides a lower power consumption by the NFC device compared to the first NFC mode. A controller may also be coupled with the satellite position determining device and the NFC device. The controller may be configured to switch the NFC device from the first NFC mode to the second NFC mode based upon a determination of movement of the mobile wireless communications device at the rate faster than a threshold rate.

19 Claims, 4 Drawing Sheets

MOBILE WIRELESS COMMUNICATIONS DEVICE FOR NEAR FIELD COMMUNICATION (NFC) OPERATIONS AND RELATED METHODS

TECHNICAL FIELD

This application relates to the field of communications, and more particularly, to mobile wireless communications devices and related methods that use Near Field Communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
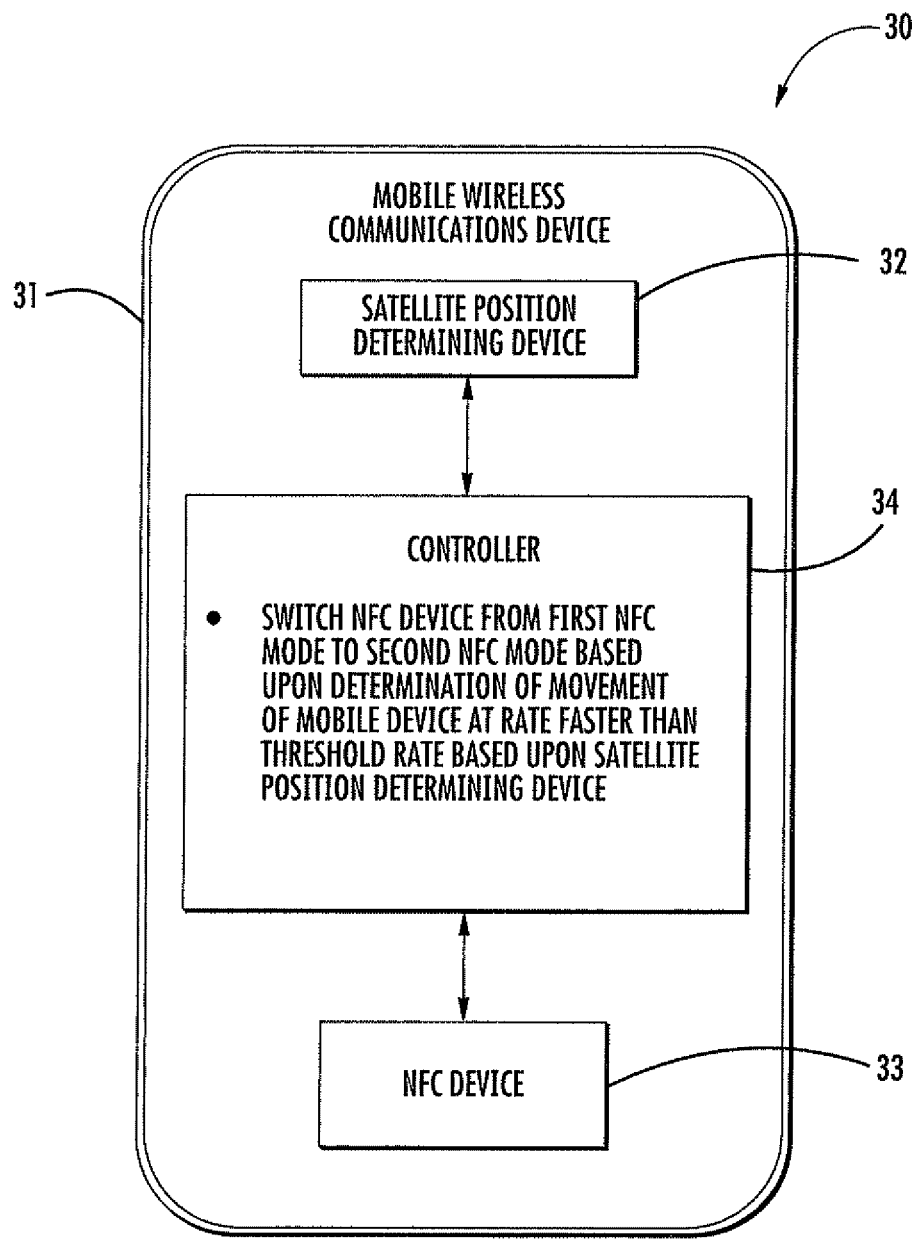
FIG. 1 is a schematic block diagram of a mobile wireless communications device in accordance with an example embodiment.
Figure 2:
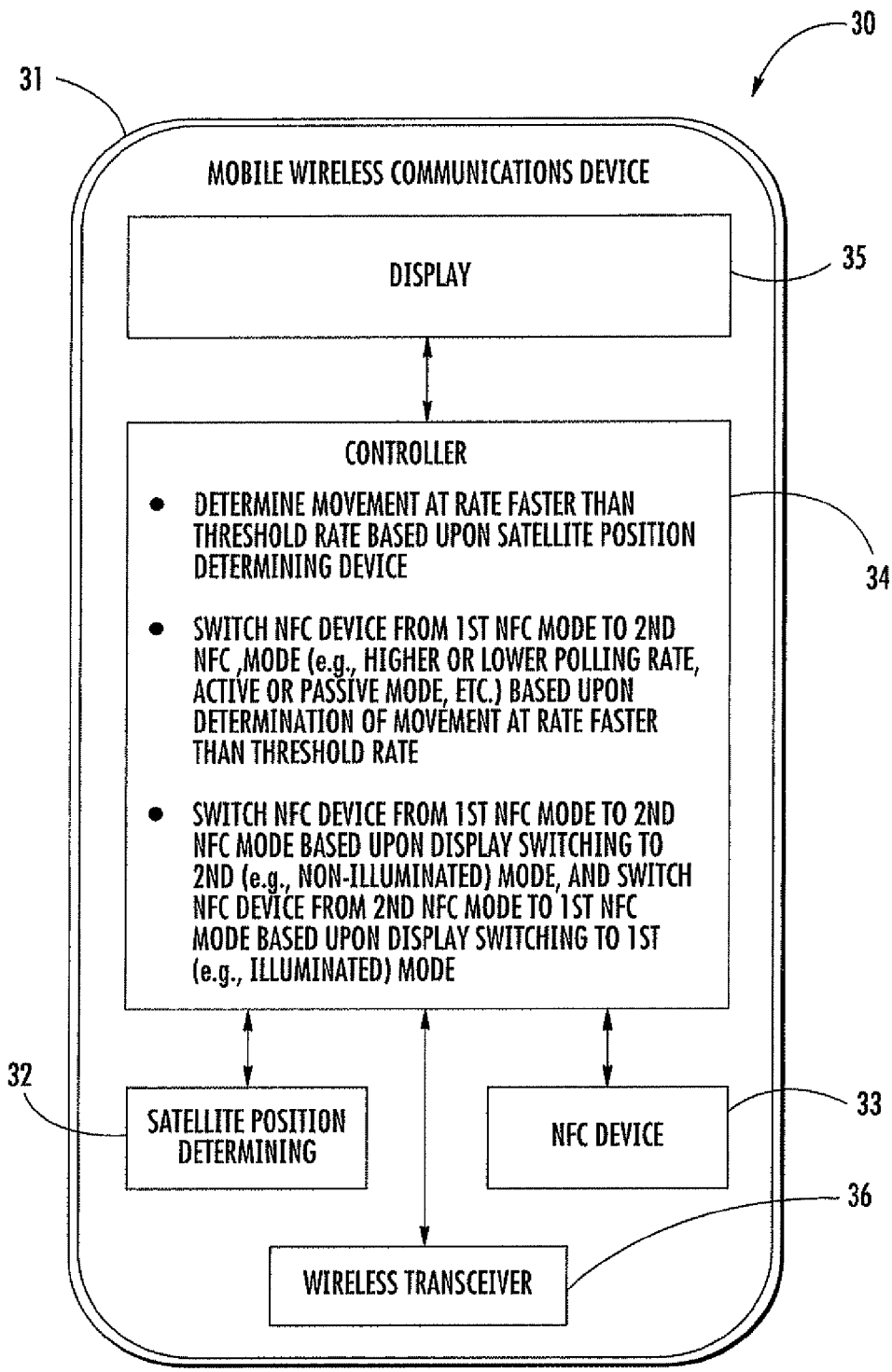
FIG. 2 is a schematic block diagram of the mobile wireless communications device of FIG. 1 in accordance with another example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is disclosed herein which may include a satellite position determining device, and a near-field communication (NFC) device being switchable between a first NFC mode and a second NFC mode, wherein the second NFC mode provides a lower power consumption by the NFC device compared to the first NFC mode. A controller may also be coupled with the satellite position determining device and the NFC device. The controller may be configured to switch the NFC device from the first NFC mode to the second NFC mode based upon a determination of movement of the mobile wireless communications device at the rate faster than a threshold rate. Accordingly, enhanced power savings may be achieved by selectively switching the NFC device to consume less power when traveling in an automobile, etc., when NFC communication may be less likely to occur.

More particularly, the controller may be further configured to determine a change in movement to a rate below the threshold rate based upon the satellite position determining device, and switch the NFC device from the second NFC mode to the first NFC mode based upon the change in movement to the rate below the threshold rate. Furthermore, the mobile wireless communications device may also include a display carried by the housing and coupled to the controller. The display may be switchable between a first (e.g., an illuminated or bright) display mode and a second (e.g., a non-illuminated or dim) display mode. Moreover, the controller may be further configured to switch the NFC device from the first NFC mode to the second NFC mode based upon the display switching to the second display mode, and to switch the NFC device from the second NFC mode to the first NFC mode based upon the display switching to the first display mode.

In addition, the controller may be further configured to switch the NFC device between the first NFC mode and the second NFC based upon a time of day, a location of the mobile wireless communications device, etc. By way of example, the NFC device may be configured to perform NFC polling at a first rate in the first NFC mode, and to perform NFC polling at a second rate in the second mode, wherein the second rate may be lower than the first rate. Also by way of example, the first NFC mode may comprise an active NFC mode, and the second NFC mode may comprise a passive NFC mode. The mobile wireless communications device may also include a wireless transceiver carried by the portable housing and coupled to the controller.

A related method for operating a mobile wireless communications device, such as the one described briefly above, is also provided. The method may include switching the NFC device from the first NFC mode to the second NFC mode based upon a determination of movement of the mobile wireless communications device at a rate faster than a threshold rate based upon the satellite position determining device.

A computer-readable medium is also provided for a mobile wireless communications device, such as the one described briefly above. The computer-readable medium may have computer-executable instructions for causing the mobile wireless communications device to perform steps comprising switching the NFC device from the first NFC mode to the second NFC mode based upon a determination of movement of the mobile wireless communications device at a rate faster than a threshold rate based upon the satellite position determining device.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

An NFC device, when operating in an active mode, draws power to generate a radio frequency (RF) field when it is searching for other NFC devices or contactless NFC cards/tags in its vicinity. In a mobile wireless communications device (also referred to as a "mobile device" herein) that utilizes a battery as a power source, for example, continuous use of an NFC transceiver of the mobile device in an active mode may result in a significant consumption of battery power, and therefore an undesirable decrease in battery life.

Turning initially to FIG. 1, a mobile device 30 and associated method aspects are now described which may advantageously provide for reduced power consumption from NFC components. More particularly, the mobile device 30 illustratively includes a housing 31, a satellite position determining device 32 carried by the housing, and an NFC device 33 carried by the housing. Example mobile devices 30 may include portable or personal media players (e.g., MP3 players, video players, etc.), remote controls (e.g., television or stereo remotes, vehicle remotes, etc.), portable gaming devices, portable or mobile telephones, smartphones, tablet computers, electronic readers (e-readers), etc. Also by way of example, the satellite position determining device 32 may comprise a Global Positioning System (GPS) device, although other satellite position determining formats (e.g., GALILEO, GLONASS, etc.) may also be used in some embodiments.

The NFC device 33 may comprise an NFC transceiver and may be switchable between a first NFC mode and a second NFC mode. Generally speaking, the second NFC mode provides a lower power consumption by the NFC device 33 as compared to the first NFC mode, as will be discussed further below.

The mobile device 30 further illustratively includes a controller 34 carried by the housing 31 and coupled with the satellite position determining device 32 and the NFC device 33. The controller 34 may be implemented using a combination of hardware (e.g., microprocessor, memory, etc.) and software components, such as a non-transitory computer-readable medium having computer-executable instructions for performing the operations described herein.

Figure 3:
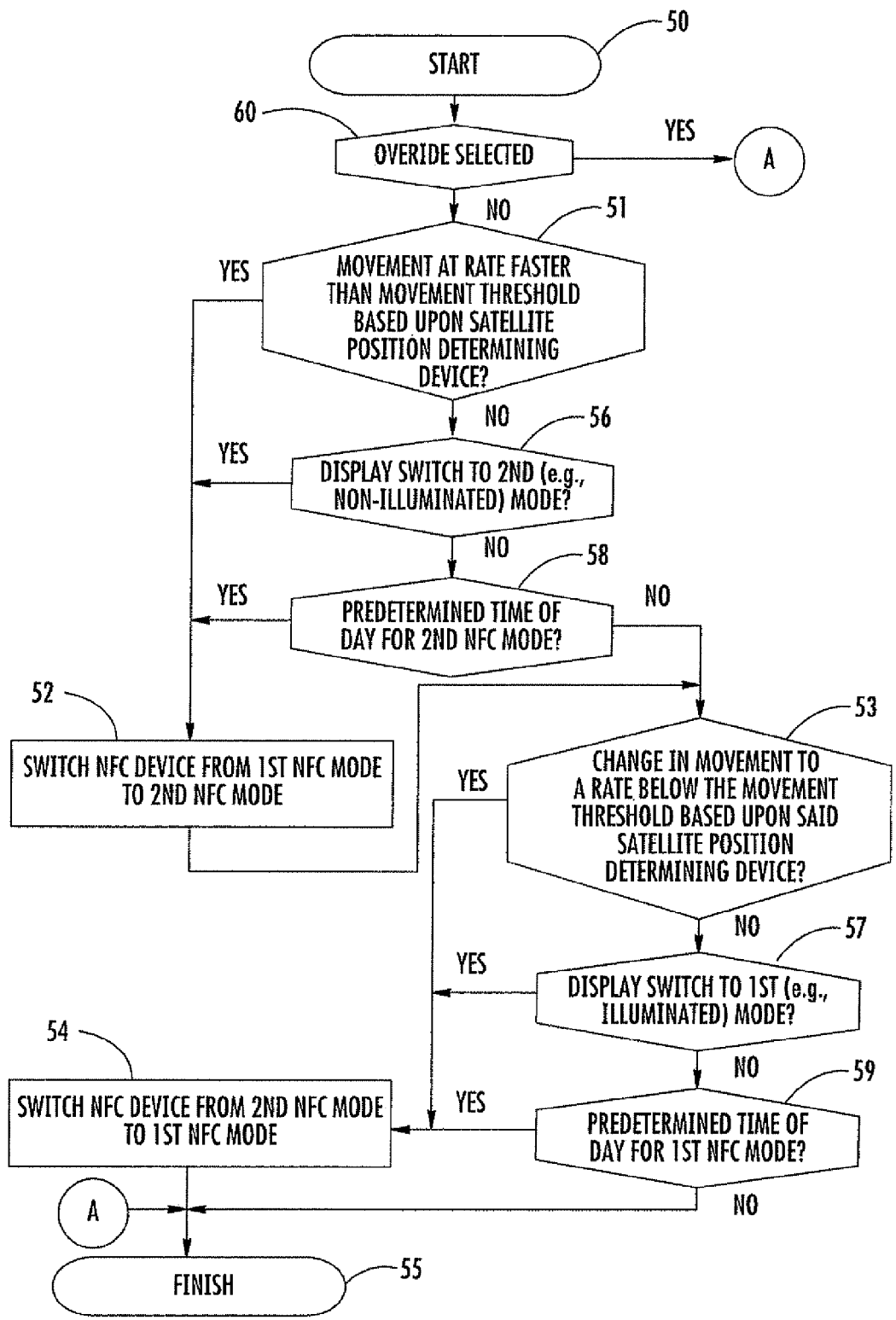
FIG. 3 is a flow diagram illustrating method aspects associated with operation of the mobile wireless communications devices of FIGS. 1 and 2.

Referring additionally to FIG. 3, beginning at Block 50, the controller 34 may be configured to determine movement of the mobile device 30 at a rate faster or higher than a movement threshold or threshold rate based upon the satellite position determining device 32, at Block 51. By way of example, the movement threshold may be a speed threshold selected to be at a rate faster than a walking pace, which in many circumstances is indicative that NFC communications are unlikely to occur in the short term. For example, if a mobile device is moving at a pace indicative of jogging or bicycle riding, a user may be exercising, for example, in which case it may be unlikely that the mobile device will be needed for NFC communication at that time. Similarly, moving at a speed indicative of vehicle travel may indicate that a user is in an automobile, for example, where NFC communications may also be unlikely to occur. Upon detection of movement of the mobile device 30 at the rate faster than a movement threshold, the controller 34 may advantageously switch the NFC device 33 from the first NFC mode to the second NFC mode, at Block 52.

In one example implementation, the first NFC mode may be an active mode wherein an RF field is generated continuously or at a given polling rate, and the second NFC mode may be a passive (i.e., not powered) mode where no RF field is generated. In another example implementation, the NFC device 33 may perform polling at a higher frequency in the first NFC mode, and at a lower frequency in the second NFC mode. That is, in this example embodiment both the first NFC mode and second NFC mode may be considered as active modes, yet the polling frequency is lower in the second NFC mode to advantageously provide power savings. By way of example, the second NFC mode may correspond to an NFC low power mode, in which the NFC device 33 cycles on (high power) and off (low power), such as every three seconds, while in the first NFC mode polling occurs at a faster rate (e.g., every one second or less). However, in different embodiments the first and second frequencies may take other values besides those example values set forth herein. As such, the NFC device 33 may advantageously provide desired recognition of other NFC-enabled devices (e.g., NFC tags) without undue delay, yet while still maintaining power savings from relatively low-power operation when moving at or above the movement threshold.

In accordance with another example implementation, the first NFC mode and the second NFC mode may be implemented by setting the active NFC mode "on" or "burst" time to a given or fixed duration, and changing the time between bursts. That is, the controller 34 may cycle the NFC device 33 to an active NFC burst mode with longer or shorter durations therebetween. Generally speaking, the duration of the active mode pulse should be long enough to recognize a load on the electromagnetic field, such as about 60 µs, although other durations may also be used.

The controller 34 may be further configured to determine a change in movement to a rate below the movement threshold based upon the satellite position determining device 32, at Block 53, and switch the NFC device 33 from the second NFC mode to the first NFC mode based upon the change in movement to the rate below the movement threshold, at Block 54, which illustratively concludes the method of FIG. 3 (Block 55). That is, when movement of the mobile device 30 is below a movement threshold, there may be a higher likelihood that the mobile device will be engaged in NFC communication, so that it is appropriate for the NFC device 33 to be in the first NFC mode for more rapid recognition of other NFC-enabled devices.

It should be noted that in some embodiments hysteresis in switching between the first NFC mode and the second NFC mode may be used. That is, the movement threshold may comprise an upper and a lower threshold, and switching from the first NFC mode to the second NFC mode may occur at the upper threshold, but switching back to the first NFC mode would not occur until the rate of movement falls below the lower threshold. Moreover, other factors may be taken into account by the controller 34 in determining when to switch between the first NFC mode and the second NFC, such as a delay period or time. For example, if the mobile device 30 is moving at a high rate of speed (e.g., highway speeds), and then comes to a stop, it may be that the vehicle the mobile device is traveling in has only momentarily slowed down, such as for a toll booth, etc. The controller 34 may optionally wait for a designated delay period (e.g., one or more minutes, etc.) after the reduced speed is detected before switching the NFC device 33 from the second NFC mode to the first NFC mode. Similarly, another factor that may be considered is a position determined by the satellite position determining device 32. For example, even if a reduction in speed below the movement threshold is detected, if the current position determined by the satellite position determining device 32 is on a highway, then switching to the first NFC mode may be postponed or overridden.

Detection of movement at a rate faster than the movement threshold may therefore be considered as a "triggering" event for switching from the first NFC mode to the second NFC mode. In some example embodiments, other triggering events may also be used for switching between the first NFC mode and the second NFC mode. By way of example, the mobile device 30 may further include a display 35 and a wireless transceiver (e.g., cellular, Bluetooth, WiMAX, WiFi, etc.) carried by the housing 31 and coupled to the controller 34. The display 35 may be switchable between an a first display mode (e.g., an illuminated or bright mode) and a second display mode (e.g., a non-illuminated of dim mode), which may also be considered as a "sleep" mode. As such, the controller 34 may be further configured to switch the NFC device 33 from the first NFC mode to the second NFC mode based upon the display switching to the second (e.g., non-illuminated) display mode (Block 56), and to switch the NFC device from the second NFC mode to the first NFC mode based upon the display switching to the first (e.g., illuminated) display mode (Block 57).

Another example triggering event may be a time of day. More particularly, the controller 34 may be further configured to switch the NFC device 33 between the first NFC mode and the second NFC based upon a time of day (Blocks 58 and 59), such as at a "sleep" time in the evening or at a "wake-up" time in the morning. Moreover, if movement of the mobile device 30 is detected that is faster than the movement threshold, and it coincides with a particular time of day (e.g., work commute time, etc.), this information may be further used by the controller 34 in determining whether to switch the NFC device 33 between the first NFC mode and the second NFC mode. For example, despite the mobile device 30 slowing to a stop during the morning commute for an extended period (e.g., traffic, accident, etc.), the controller 34 may recognize from the given time of day that the user is likely commuting even though presently at a stop, and therefore not switch from the second NFC mode to the first NFC mode despite the determined speed being below the movement threshold.

In accordance with another example, location information may also be used by the controller 34 in determining whether to switch the NFC device 33 between the first NFC mode and the second NFC mode. For example, if the mobile device 30 is in an automobile, and the automobile slows down on a highway due to a traffic jam, then this location may be used to determine that the mobile device is on a highway and it is unlikely to be swiped with any NFC tags or readers.

In this way, the controller 34 provides a temporary override for mode switching of the NFC device 33. However, it should be noted that a manual override may also be performed based upon input from another input device, such as a keypad, touch screen, etc., at Block 60. For example, a user may be traveling on a train where smart-poster NFC tags are present that the user wants to swipe with the mobile device 30. In such case, the controller may be configured to switch to the first NFC mode based upon a menu selection, actuation of a designated button or key, etc. Input from other devices may also be used for determining whether to switch between the first NFC mode and the second NFC mode, such as an accelerometer, etc., in some example embodiments.

Example components of a mobile wireless communications device 1000 that may be used in accordance with an example embodiment are further described below with reference to FIG. 4. The device 1000 illustratively includes a housing 1200, a keyboard or a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
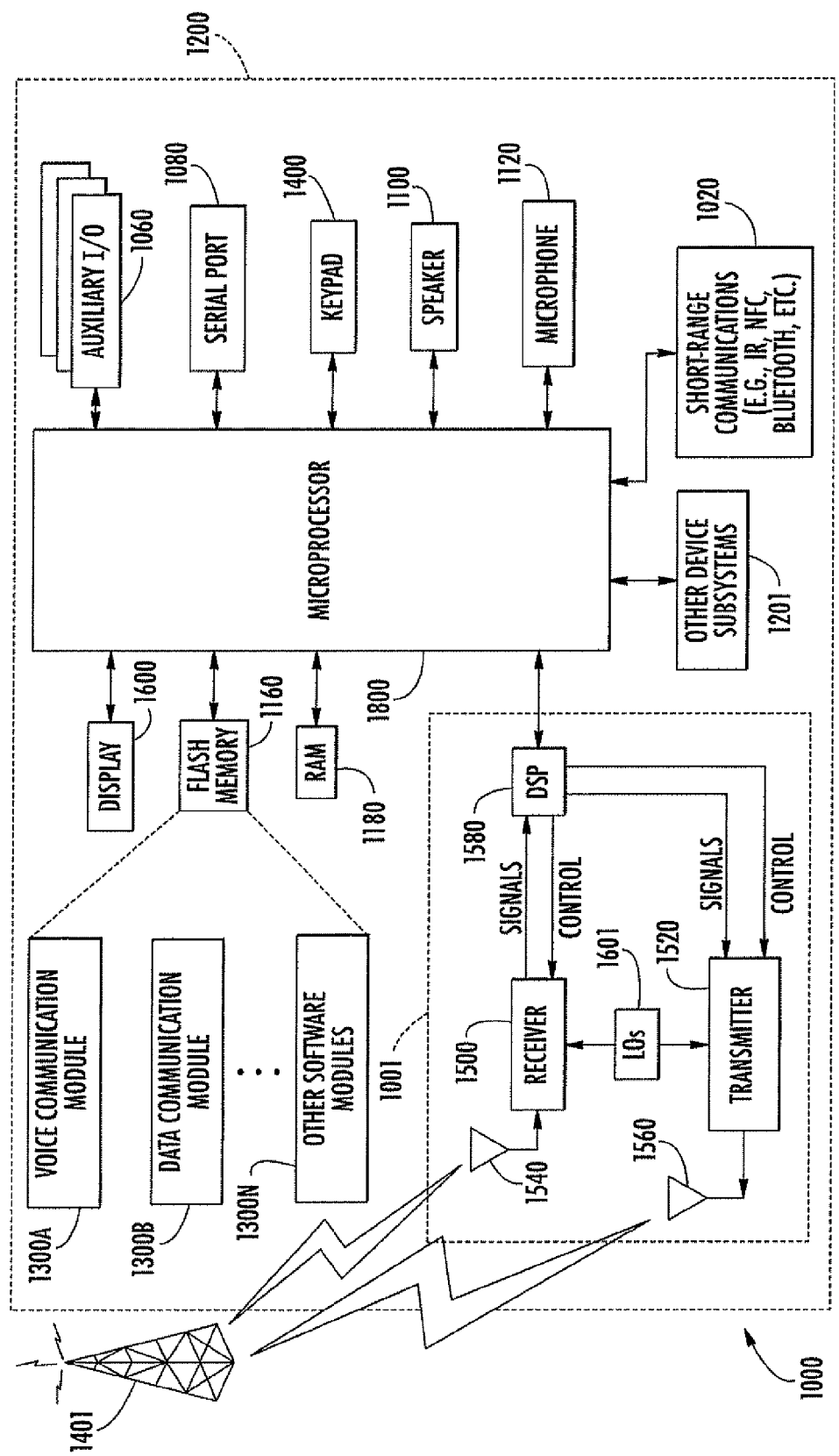
FIG. 4 is a schematic block diagram illustrating example components of a mobile wireless communications device that may be used in accordance with the devices of FIG. 1 or 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a satellite position determining device;
a near-field communication (NEC) device, said NFC device being switchable between a first NFC mode and a second NFC mode, the second NFC mode providing a lower power consumption by said NFC device compared to the first NFC mode; and
a controller coupled with said satellite position determining device and said NFC circuit, said controller being configured to
switch said NFC device from the first NFC mode to the second NFC mode based upon a determination of movement of the mobile wireless communications device at a rate faster than a threshold rate based upon said satellite position determining device,
determine a change in movement to a rate below the threshold rate based upon said satellite position determining device,
determine whether a geographical position of the mobile wireless communications device corresponds to a roadway based upon said satellite position determining device, and
switch said NFC device from the second NFC mode to the first NFC mode based upon the change in movement to the rate below the threshold rate and a determination that the geographical position does not correspond to a roadway.

2. The mobile wireless communications device of claim 1 wherein said NFC device is configured to perform NFC polling at a first rate in the first NFC mode, and to perform NFC polling at a second rate in the second NFC mode, wherein the second rate is lower than the first rate.

3. The mobile wireless communications device of claim 1 wherein the first NFC mode comprises an active NFC mode.

4. The mobile wireless communications device of claim 1 wherein the second NFC mode comprises a passive NFC mode.

5. The mobile wireless communications device of claim 1 further comprising a display carried by said housing and coupled to said controller; wherein said display is switchable between a first display mode and a second display mode; and wherein said controller is further configured to switch said NFC device from the first NFC mode to the second NFC mode based upon said display switching to the second display mode, and to switch said NFC device from the second NFC mode to the first NFC mode based upon said display switching to the first mode.

6. The mobile wireless communications device of claim 5 wherein the first display mode comprises an illuminated mode, and wherein the second display mode comprises a non-illuminated mode.

7. The mobile wireless communications device of claim 1 wherein said controller is further configured to switch said NFC device between the first NFC mode and the second NFC mode based upon a time of day.

8. The mobile wireless communications device of claim 1 wherein said controller is further configured to switch said NFC device between the first NFC mode and the second NFC mode based upon a location of the mobile wireless communications device.

9. The mobile wireless communications device of claim 1 further comprising a wireless transceiver carried by said portable housing and coupled to said controller.

10. A method for operating a mobile wireless communications device comprising a satellite position determining device and a near-field communication (NEC) device being switchable between a first NFC mode and a second NFC mode, the second NFC mode providing a lower power consumption by the NFC device compared to the first NFC mode, the method comprising:
- switching the NFC device from the first NFC mode to the second NFC mode based upon a determination of movement of the mobile wireless communications device at a rate faster than a threshold rate based upon the satellite position determining device;
- determining a change in movement to a rate below the threshold rate based upon said satellite position determining device;
- determining whether a geographical position of the mobile wireless communications device corresponds to a roadway based upon the satellite position determining device; and
- switching the NFC device from the second NFC mode to the first NFC mode based upon the change in movement to the rate below the threshold rate and a determination that the geographical position does not correspond to a roadway.

11. The method of claim 10 wherein the NFC device is configured to perform NFC polling at a first rate in the first NFC mode, and to perform NFC polling at a second rate in the second mode, wherein the second rate is lower than the first rate.

12. The method of claim 10 wherein the first NFC mode comprises an active NFC mode; and wherein the second NFC mode comprises a passive NFC mode.

13. The method of claim 10 wherein the mobile wireless communications device further comprises a display switchable between a first display mode and a second display mode; and further comprising switching the NFC device from the first NFC mode to the second NFC mode based upon the display switching to the second display mode, and switching the NFC device from the second NFC mode to the first NFC mode based upon the display switching to the first display mode.

14. The method of claim 10 further comprising switching the NFC device between the first NFC mode and the second NFC mode based upon a time of day.

15. A computer-readable medium for a mobile wireless communications device comprising a satellite position determining device and a near-field communication (NFC) device being switchable between a first NFC mode and a second NFC mode, the second NFC mode providing a lower power consumption by the NFC device compared to the first NFC mode, the computer-readable medium having computer-executable instructions for causing the mobile wireless communications device to perform steps comprising:
- switching the NFC device from the first NFC mode to the second NFC mode based upon a determination of movement of the mobile wireless communications device at a rate faster than a threshold rate based upon the satellite position determining device;
- determining a change in movement to a rate below the threshold rate based upon said satellite position determining device;
- determining whether a geographical position of the mobile wireless communications device corresponds to a roadway based upon the satellite position determining device; and
- switching the NFC device from the second NFC mode to the first NFC mode based upon the change in movement to the rate below the threshold rate and a determination that the geographical position does not correspond to a roadway.

16. The computer-readable medium of claim 15 wherein the NFC device is configured to perform NFC polling at a first rate in the first NFC mode, and to perform NFC polling at a second rate in the second mode, wherein the second rate is lower than the first rate.

17. The computer-readable medium of claim 15 wherein the first NFC mode comprises an active NFC mode; and wherein the second NFC mode comprises a passive NFC mode.

18. The computer-readable medium of claim 15 wherein the mobile wireless communications device further comprises a display switchable between a first display mode and a second display mode; and further having computer-executable instructions for causing the mobile wireless communications device to perform steps comprising switching the NFC device from the first NFC mode to the second NFC mode based upon the display switching to the second display mode, and switching the NFC device from the second NFC mode to the first NFC mode based upon the display switching to the first display mode.

19. The computer-readable medium of claim 15 further having computer-executable instructions for causing the mobile wireless communications device to perform steps comprising switching the NFC device between the first NFC mode and the second NFC mode based upon a time of day.

* * * * *

UNITED STATES PATENT AND TRADEMARK OFFICE
CERTIFICATE OF CORRECTION

| | | |
|---|---|---|
| PATENT NO. | : 8,718,549 B2 | Page 1 of 1 |
| APPLICATION NO. | : 13/241615 | |
| DATED | : May 6, 2014 | |
| INVENTOR(S) | : Hagedorn | |

It is certified that error appears in the above-identified patent and that said Letters Patent is hereby corrected as shown below:

In the Claims

Column 8, Line 1, Claim 1          Delete: "(NEC)"
                                                         Insert: --(NFC)--

Column 8, Line 66, Claim 10      Delete: "(NEC)"
                                                         Insert: --(NFC)--

Signed and Sealed this
Ninth Day of September, 2014

Michelle K. Lee
*Deputy Director of the United States Patent and Trademark Office*